(12) United States Patent
Gopalakrishnan et al.

(10) Patent No.: US 11,811,212 B2
(45) Date of Patent: Nov. 7, 2023

(54) SYNCHRONIZATION OF ELECTRONIC FUSES IN VEHICLE POWER DISTRIBUTION

(71) Applicant: GM Global Technology Operations LLC, Detroit, MI (US)

(72) Inventors: Suresh Gopalakrishnan, Troy, MI (US); Chandra S. Namuduri, Troy, MI (US); Lyall Kenneth Winger, Waterloo (CA); James Morrison, Sebringville (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/686,754

(22) Filed: Mar. 4, 2022

(65) Prior Publication Data
US 2023/0283061 A1 Sep. 7, 2023

(51) Int. Cl.
*H02H 3/20* (2006.01)
*H02H 3/02* (2006.01)

(52) U.S. Cl.
CPC ............. *H02H 3/021* (2013.01); *H02H 3/20* (2013.01); *H02H 3/202* (2013.01)

(58) Field of Classification Search
CPC .......... H02H 3/021; H02H 3/20; H02H 3/202; H02H 3/00
USPC ..................... 361/86–87, 93.7–93.9
See application file for complete search history.

(56) References Cited

U.S. PATENT DOCUMENTS

| | | | |
|---|---|---|---|
| 2018/0366946 A1* | 12/2018 | Handy | H02H 3/08 |
| 2019/0089343 A1* | 3/2019 | Brugger | H03K 17/08122 |
| 2019/0140438 A1* | 5/2019 | Schiemann | H02H 3/087 |
| 2021/0288486 A1* | 9/2021 | Kitano | H02J 1/00 |

* cited by examiner

*Primary Examiner* — Danny Nguyen
(74) *Attorney, Agent, or Firm* — CANTOR COLBURN LLP

(57) ABSTRACT

A system in a vehicle includes a first fuse connected between a power source and a load. The first fuse is an electronic fuse (eFuse) to disconnect the load from the power source via the first fuse based on detecting a failure in the first fuse. The system also includes a second fuse connected between the power source and the load, the first fuse and the second fuse being part of a cluster of fuses. The second fuse is an eFuse and the first fuse signals the second fuse to disconnect the load from the power source via the second fuse based on the first fuse detecting the failure in the first fuse without the second fuse detecting a failure in the second fuse.

20 Claims, 4 Drawing Sheets

SYNCHRONIZATION OF ELECTRONIC FUSES IN VEHICLE POWER DISTRIBUTION

INTRODUCTION

The subject disclosure relates to the synchronization of electronic fuses (eFuses) in vehicle power distribution.

Vehicles (e.g., automobiles, trucks, construction equipment, farm equipment, automated factory equipment) include a number of systems that may be regarded as loads powered by the vehicle's battery. Generally, a battery distribution unit supplies power from the battery to electric centers of the vehicle. Each of the electric centers may further distribute the power to one or more loads. The battery distribution unit and electric centers include fuses to disconnect a load from the battery based on the detection of a fault. Accordingly, it is desirable to provide the synchronization of electronic fuses (eFuses) in vehicle power distribution.

SUMMARY

In one exemplary embodiment, a system in a vehicle includes a first fuse connected between a power source and a load. The first fuse is an electronic fuse (eFuse) that disconnects the load from the power source via the first fuse based on detecting a failure in the first fuse. The system also includes a second fuse connected between the power source and the load, the first fuse and the second fuse being part of a cluster of fuses. The second fuse is an eFuse and the first fuse signals the second fuse to disconnect the load from the power source via the second fuse based on the first fuse detecting the failure in the first fuse without the second fuse detecting a failure in the second fuse.

In addition to one or more of the features described herein, the system also includes a third fuse connected between the power source and a second load. The third fuse is an eFuse and is not part of the cluster of fuses and continues to connect the power source to the second load despite the first fuse detecting the failure in the first fuse.

In addition to one or more of the features described herein, each of the cluster of fuses includes a switch controller and a switch to directly connect the power source to the load, and the switch controller of the first fuse is configured to detect the failure in the first fuse and control the switch of the first fuse to disconnect the load from the power source via the first fuse.

In addition to one or more of the features described herein, each of the cluster of fuses includes a synchronization switch, and the switch controller of the first fuse signals the synchronization switch of the first fuse based on detecting the failure in the first fuse.

In addition to one or more of the features described herein, each of the cluster of fuses includes two fault switches coupled to the synchronization switch.

In addition to one or more of the features described herein, the first fuse and the second fuse are connected via one of the two fault switches of the first fuse and one of the two fault switches of the second fuse.

In addition to one or more of the features described herein, the synchronization switch of the first fuse connects to ground based on the signal from the switch controller of the first fuse.

In addition to one or more of the features described herein, the one of the two fault switches of the first fuse and the one of the two fault switches of the second fuse connect to ground via the synchronization switch to thereby act as the signal to the second fuse to disconnect the load from the power source via the second fuse.

In addition to one or more of the features described herein, the first fuse receives an external input from an external controller that is external to the cluster of fuses.

In addition to one or more of the features described herein, the first fuse operates the switch of the first fuse and the synchronization switch of the first fuse based on the external input.

In another exemplary embodiment, a method of arranging a system in a vehicle includes connecting a first fuse between a power source and a load. The first fuse is an electronic fuse (eFuse) and disconnects the load from the power source via the first fuse based on detecting a failure in the first fuse. The method also includes connecting a second fuse connected between the power source and the load, the first fuse and the second fuse being part of a cluster of fuses. The second fuse is an eFuse and the first fuse signals the second fuse to disconnect the load from the power source via the second fuse based on the first fuse detecting the failure in the first fuse without the second fuse detecting a failure in the second fuse.

In addition to one or more of the features described herein, the method also includes connecting a third fuse between the power source and a second load, wherein the third fuse is an eFuse and is not part of the cluster of fuses and continues to connect the power source to the second load despite the first fuse detecting the failure in the first fuse.

In addition to one or more of the features described herein, the method also includes including a switch controller and a switch in each of the cluster of fuses to directly connect the power source to the load and configuring the switch controller of the first fuse to detect the failure in the first fuse and control the switch of the first fuse to disconnect the load from the power source via the first fuse.

In addition to one or more of the features described herein, the method also includes including a synchronization switch in each of the cluster of fuses, and configuring the switch controller of the first fuse to signal the synchronization switch of the first fuse based on detecting the failure in the first fuse.

In addition to one or more of the features described herein, the method also includes including two fault switches coupled to the synchronization switch in each of the cluster of fuses.

In addition to one or more of the features described herein, the method also includes connecting the first fuse and the second fuse via one of the two fault switches of the first fuse and one of the two fault switches of the second fuse.

In addition to one or more of the features described herein, the method also includes configuring the synchronization switch of the first fuse to connect to ground based on the signal from the switch controller of the first fuse.

In addition to one or more of the features described herein, the method also includes configuring the one of the two fault switches of the first fuse and the one of the two fault switches of the second fuse to connect to ground via the synchronization switch to thereby act as the signal to the second fuse to disconnect the load from the power source via the second fuse.

In addition to one or more of the features described herein, the method also includes configuring the first fuse to receive an external input from an external controller that is external to the cluster of fuses.

In addition to one or more of the features described herein, the method also includes configuring the first fuse to operate the switch of the first fuse and the synchronization switch of the first fuse based on the external input.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
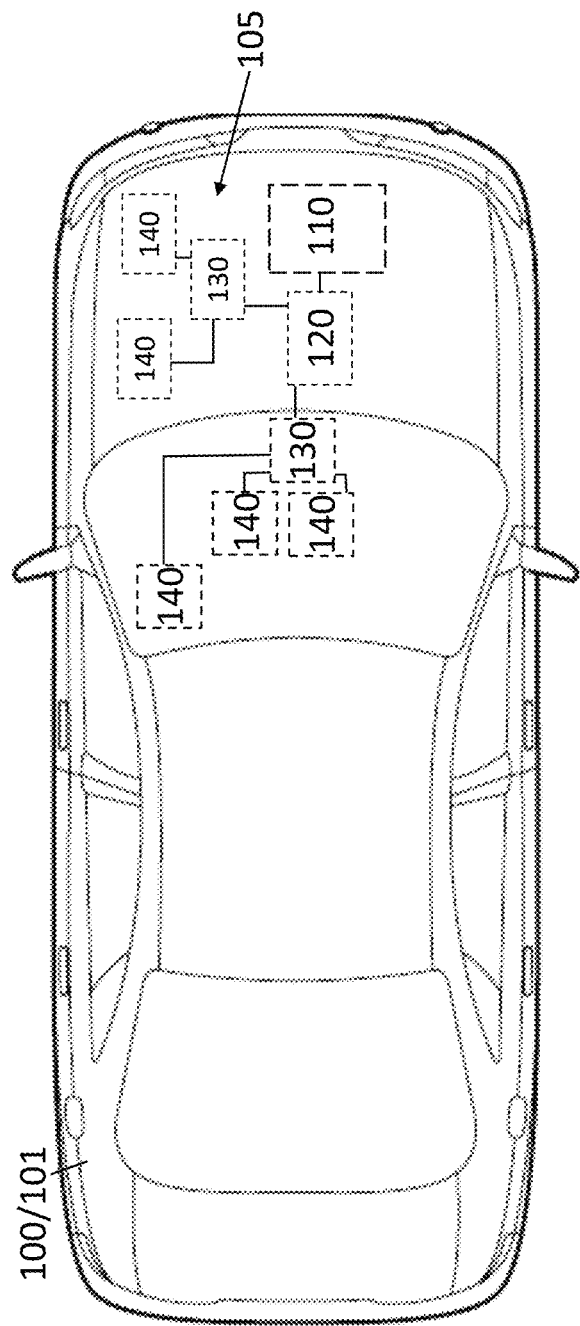
FIG. 1 is a block diagram of a vehicle in which synchronization of electronic fuses (eFuses) is implemented according to one or more embodiments.

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to the synchronization of eFuses in vehicle power distribution. As previously noted, a number of vehicle systems (e.g., components of the engine or the infotainment system), referred to as loads, may be powered by the vehicle battery via a battery distribution unit and electric centers. The fuses used to protect the power distribution system and the loads from over-current, over-voltage, over-temperature, and other faults may be eFuses, which are implemented as integrated circuits. The eFuses and microcontrollers that control them may be referred to together as a smart electrical center (SEC), for example.

A custom SEC according to each vehicle or vehicle type may be inefficient and costly due to the testing, cybersecurity infrastructure, and other issues associated with microcontroller-based electrical centers. Thus, SECs for every vehicle may have identical hardware, including identical eFuses, with customization achieved via the cable assembly and software. In this case, because different vehicles have different loads and even the same vehicle may have different load sizes (e.g., one load has twice the full load current of another), power may be supplied to some loads through a cluster of two or more eFuses rather than a single one. In a given eFuse, the detection of a fault condition may cause a field effect transistor (FET) to open, thereby opening the circuit between the battery and the load associated with the given eFuse. This condition may be referred to as the eFuse being disabled.

To avoid misinterpreting a transient condition for a fault and disabling an eFuse unnecessarily, each eFuse may include an internal filter to delay reacting to a fault condition (e.g., by 4-6 microseconds). When two or more eFuses are part of a cluster that is coupled to the same load, this delay may be problematic. That is, as each eFuse in a cluster is disabled in reaction to a fault, the current through other eFuses with closed FETs increases until a fault condition is reached in each of those other eFuses in turn. The process is further delayed by the additional built-in delay. As detailed, the eFuses and interconnection among eFuses of a cluster, according to one or more embodiments, facilitates synchronized disabling of all the eFuses of the cluster so that any damage caused by the delay is mitigated.

In accordance with an exemplary embodiment, FIG. 1 is a block diagram of a vehicle 100 in which synchronization of eFuses 210 (FIG. 2) is implemented. Aspects of an exemplary power distribution system 105 are shown. A battery 110 is coupled to a battery distribution unit 120. The battery distribution unit 120 is shown coupled to two SECs 130. Each of the SECs 130 may be coupled to one or more loads 140. As shown in FIG. 1, one of the SECs 130 is coupled to two loads 140 while the other SEC 130 is coupled to three loads 140. As further discussed with reference to FIG. 2, each of the SECs 130 may include one or more eFuses 210 coupled to each of the loads 140. Each of the SECs 130 may also include one or more external controllers 410 (FIG. 4) that are external to the eFuses 210. While synchronization among eFuses 210 of a cluster 205 is discussed with specific reference to the exemplary SEC 130 shown in FIG. 2 for explanatory purposes, any eFuses 210 organized in a cluster 205 (e.g., in the battery distribution unit 102, in a power distribution system 105 with a different architecture, outside the vehicle application) may benefit from the synchronization detailed herein.

Figure 2:
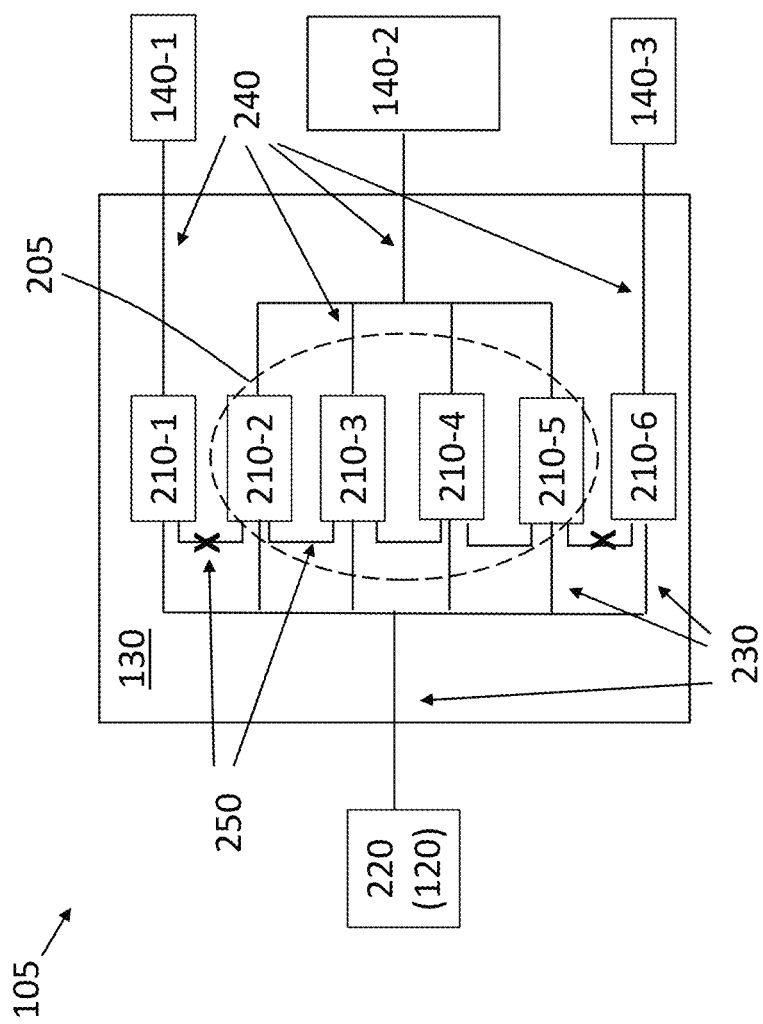
FIG. 2 details aspects of a power distribution system that implements synchronization of eFuses of a cluster according to one or more embodiments.

FIG. 2 details aspects of an exemplary power distribution system 105 that implements synchronization of eFuses 210 of a cluster 205 according to one or more embodiments. An exemplary SEC 130 is shown to include eFuses 210-1 through 210-6 (generally referred to as 210) coupled to loads 140-1, 140-2, and 140-3 (generally referred to as 140). One or more external controllers 410 (FIG. 4) are not shown. The eFuses 210-2, 210-3, 210-4, and 210-5 are indicated as being part of a cluster 205. That is, the eFuses 210-2, 210-3, 210-4, and 210-5 of the cluster 205 are coupled to the same load 140-2, while the eFuses 210-1 and 210-6 are respectively coupled to single loads 140-1 and 140-3. The exemplary arrangement is used for explanatory purposes and is not intended to be limiting. Any number of eFuses 210, clusters 205, and loads 140 may be present according to alternate embodiments.

As shown, each of the eFuses 210 includes a power input line 230 that couples the eFuses 210 to a power source 220. The power source 220 may be via the battery distribution unit 120 of the power distribution system 105, for example. In alternate applications and arrangements, the power source 220 may be the battery 110 or another distribution level. As also shown, each of the eFuses 210 includes a power output line 240 that couples the eFuses 210 to loads 140. In the case of eFuses 210-2, 210-3, 210-4, and 210-5, which are part of the cluster 205, all of the eFuses 210 of the cluster 205 are coupled to the same load 140-2. The eFuses 210 are additionally shown to include connectors 250 between adjacent eFuses 210. For example, the eFuses 210 may be silicon devices arranged on a printed circuit board (PCB) and the connectors 250 may be implemented as copper traces on the PCB. As indicated by "X," connectors 250 between eFuses 210 that are not within the same cluster 205 (e.g., eFuses 210-1 and 210-2 in FIG. 2) are disabled. This is further discussed with reference to FIG. 3.

As previously noted, the exemplary power distribution system 105 shown in FIG. 2 is illustrated for explanatory purposes and is not intended to limit other arrangements that may implement the synchronization among eFuses 210 of a cluster 205. For example, in a vehicle 100 that implements regenerative energy harvesting, the flow of electricity through at least some of the eFuses 210 may be bidirectional. That is, in one instance, the power source 220 may be a battery 110 supplying power through one or more eFuses 210 via the power input line 230 and then the power output line 240 to a load 140. Subsequently, power may be supplied to the battery 110 via regenerative braking, for example, through one or more eFuses 210 and the power input line 230. The synchronization detailed herein is unaffected by the direction of power flow through the eFuses 210.

Figure 3:
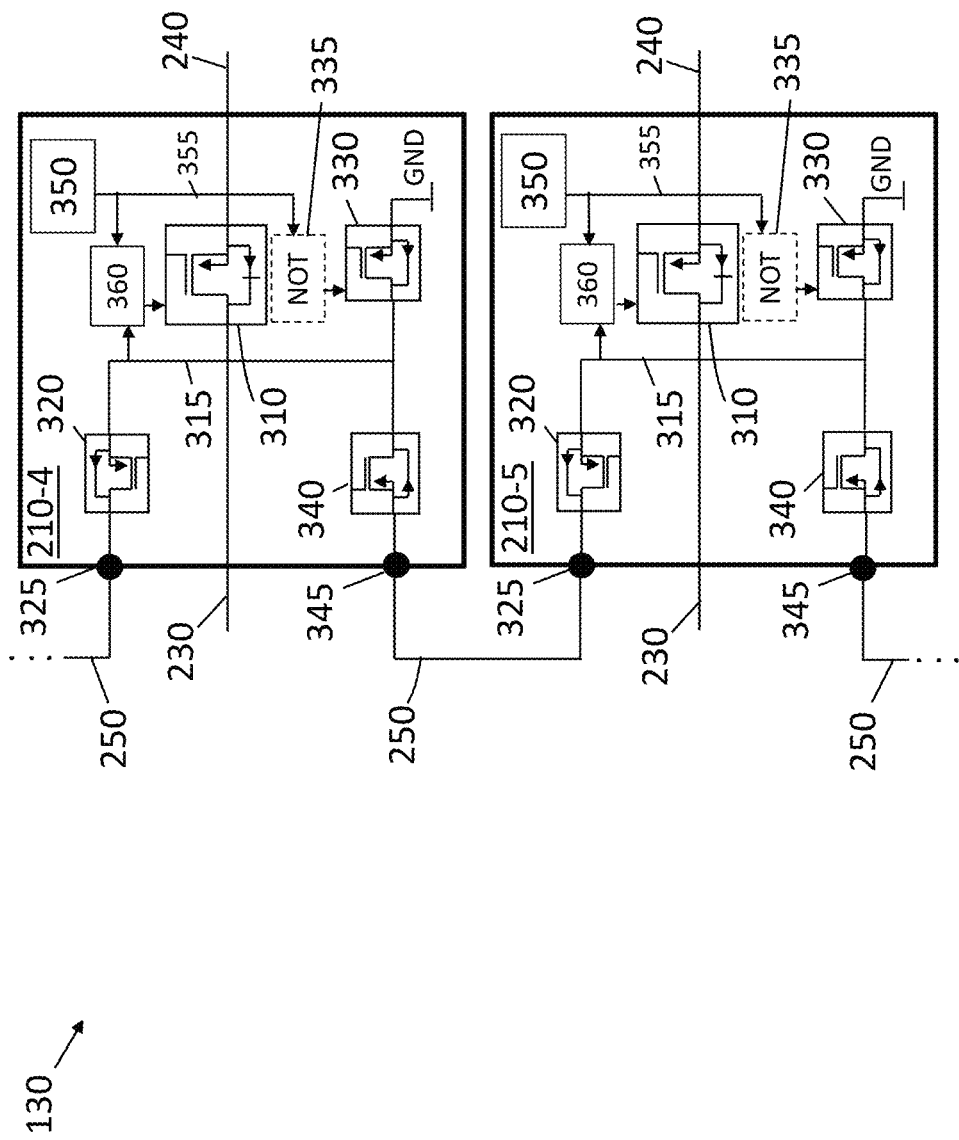
FIG. 3 details eFuses of a cluster that are synchronized according to one or more embodiments.

FIG. 3 details eFuses 210 of a cluster 205 that are synchronized according to one or more embodiments. Specifically, eFuses 210-4 and 210-5, which are shown in FIG. 2, are detailed. As previously noted, each of the eFuses 210 includes identical hardware. The power input line 230 into each eFuse 210 from a power source 220 and the power output line 240 from each eFuse 210 to a load 140 is shown. A solid state switch 310, shown implemented as a FET, is arranged between the power input line 230 and the power output line 240. This switch 310 may be opened via switch control logic 360 based on detection of a fault within the eFuse 210 by a switch controller 350 or based on synchronization among the eFuses 210 of the cluster 205, as detailed. When the switch 310 opens, the connection between the power input line 230 and the power output line 240 is interrupted.

The switch controller 350 may include known fault detection components while the switch control logic 360 provides the signals used to open or close the switch 310. The known fault detection components of the switch controller 350 may detect over-current, over-voltage, and over-temperature, for example. The components may include measurement devices and comparators that are not detailed herein. According to one or more embodiments, the switch control logic 360 may additionally obtain input from a fault line 315 that facilitates the synchronization among eFuses 210 of a cluster 205, as detailed.

Each of the eFuses 210 includes a first-side fault switch 320 connected to a first pin 325 and a second-side fault switch 340 connected to a second pin 345, as shown. These switches 320, 340 are closed to enable the associated connector 250 and opened to disable the associated connector 250, as detailed. As shown, the second pin 345 of the eFuse 210-4 is connected to the first pin 325 of the eFuse 210-5 via the connector 250, and the connector 250 is enabled when the second-side fault switch 340 of the eFuse 210-4 and the first-side fault switch 320 of the eFuse 210-5 are both closed.

According to FIG. 2, the eFuse 210-3, which is part of the cluster 205 with eFuses 210-4 and 210-5, is adjacent the eFuse 210-4. As such, a connector 250 between eFuses 210-3 and 210-4 (shown in FIG. 2) would be between a second pin 345 of eFuse 210-3 and the first pin 325 of eFuse 210-4. Both the second-side fault switch 340 of eFuse 210-3 and the first-side fault switch 320 of eFuse 210-4 would be closed to enable that connector 250, because both eFuses 210-3 and 210-4 are in the same cluster 205.

According to FIG. 2, the eFuse 210-5 is adjacent the eFuse 210-6. Thus, a connector 250 between eFuses 210-5 and 210-6 (shown in FIG. 2) would be between the second pin 345 of eFuse 210-5 and a first pin 325 of eFuse 210-6. Also according to FIG. 2, the eFuse 210-5 is part of the cluster 205, but the eFuse 210-6 is not part of the same cluster 205 as eFuse 210-5. As such, the second-side fault switch 340 of eFuse 210-5 and the first-side fault switch 320 of the eFuse 210-6 would be open to disable the connector 250 between the eFuses 210-5 and 210-6.

Each of the eFuses 210 also includes a synchronization switch 330. When the synchronization switch 330 is an N-channel FET, as shown, the optional inverter 335 ("NOT") is included. If the synchronization switch 330 were a P-channel FET, the inverter 335 would not be needed. As FIG. 3 shows, the switch controller 350 provides input to the switch control logic 360 (to operate the switch 310) and also to the synchronization switch 330, via the optional inverter 335 in the exemplary case. The operation of the switch 310 in the eFuse 210-4 based on fault detection by the switch controller 350 of the eFuse 210-4 and the subsequent operation of the switch 310 in the eFuse 210-5 based on synchronization via the synchronization switch 330 of the eFuse 210-4 are detailed.

When the switch controller 350 of the eFuse 210-4 detects a fault (e.g., overvoltage), it signals the switch control logic 360 to open the switch 310 of the eFuse 210-4, thereby opening the circuit between the power source 220 and the load 140 through the eFuse 210-4. The switch controller 350 additionally signals, via the inverter 335, the synchronization switch 330 to close and thereby connect to ground GND. The signal from the switch controller 350 may be in the form of switching a synchronization signal 355 from high to low, for example.

As previously noted, according to the exemplary arrangement shown in FIG. 2, both the first-side fault switch 320 and the second-side fault switch 340 of the eFuse 210-4 are closed (i.e., both connectors 250 associated with eFuse 210-4 are enabled). Thus, when the synchronization switch 330 closes and connects to ground GND, the second-side fault switch 340, which is closed and connected to the synchronization switch 330, allows the second pin 345 of the eFuse 210-4 to connect to ground. Also, the first-side fault switch 320, which is closed and is connected to the synchronization switch 330 via the fault line 315, allows the first pin 325 of the eFuse 210-4 to connect to ground.

At the eFuse 210-5, the first pin 325 is connected to the second pin 345 of the eFuse 210-4 via the connector 250, as shown in FIG. 3. Thus, when the second pin 345 of the eFuse 210-4 connects to ground, so does the first pin 325 of the eFuse 210-5 and, consequently, the fault line 315 of the eFuse 210-5 that is connected to the first pin 325 based on the first-side fault switch 320 being closed. As FIG. 3 indicates, the fault line 315 provides an input to the switch control logic 360. For example, the switch control logic 360 may monitor the fault line 315 and detect a change from high to low on the fault line 315 based on the fault line 315 being connected to ground. This may trigger the switch control logic 360 to open the switch 310 of the eFuse 210-5.

If the second-side fault switch 340 of the eFuse 210-5 were closed like the first-side fault switch 320 (i.e., if the connector 250 between the eFuses 210-5 and 210-6 were enabled), the first pin 325 of the eFuse 210-5 being connected to ground would additionally have a cascading effect on the second pin 345. That is, with the second-side fault switch 340 being closed, the second pin 345 of the eFuse 210-5 would also be connected to ground via the fault line 315, and, via the connector 250, the first pin 325 of the eFuse 210-6 and the fault line 315 of the eFuse 210-6 would be connected to ground, leading to the opening of the switch 310 of the eFuse 210-6. However, according to the arrangement shown in FIG. 2, the eFuse 210-6 is not part of the same cluster 205 as eFuse 210-5. Thus, as previously noted, the second-side fault switch 340 of the eFuse 210-5 and the first-side fault switch 320 of the eFuse 210-6 are open (i.e., the connector 250 between the eFuses 210-5 and 210-6 is disabled) and the second pin 345 of the eFuse 210-5 is unaffected.

Similar to the scenario discussed with reference to the eFuse 210-5, the fault detected in eFuse 210-4 may propagate to other eFuses 210 of the cluster 205 that are on the other side of the eFuse 210-4. That is, as shown in FIG. 2 and previously discussed, eFuse 210-3 is adjacent to eFuse 210-4 and connected via a connector 250 between the first pin 325 of eFuse 210-4 and a second pin 345 of the eFuse 210-3. Because the eFuses 210-3 and 210-4 are part of the same cluster 205, the first-side fault switch 320 of eFuse 210-4 and the second-side fault switch 340 of eFuse 210-3 are both closed (i.e., the connector 250 between the first pin 325 of eFuse 210-4 and the second pin 345 of the eFuse 210-3 is enabled). As such, when the switch controller 350 of the eFuse 210-4 detects a fault, signals the switch control logic 360 to open the switch 310 of the eFuse 210-4, and also signals the synchronization switch 330 of the eFuse 210-4, the first pin 325 of the eFuse 210-4 is connected to ground via the fault line 315 of the eFuse 210-4.

Because the connector 250 between the eFuses 210-3 and 210-4 is enabled, the first pin 325 of the eFuse 210-4 being connected to ground causes the second pin 345 of the eFuse 210-3 to be connected to ground, along with the fault line 315 of the eFuse 210-3. This causes the switch control logic 360 of the eFuse 210-3, which receives input from the fault line 315 (e.g., based on the switch control logic 360 monitoring whether the fault line 315 is high or low), to open the switch 310 of the eFuse 210-3. Further, when the first-side fault switch 320 is also closed in eFuse 210-3, as it would be according to the arrangement shown in FIG. 2, the first pin 325 of the eFuse 210-3 would also connect to ground, resulting in a cascading effect and opening of the switch 310 in eFuse 210-2.

Thus, in the exemplary arrangement of FIG. 2, if the eFuse 210-4 is the first eFuse 210 to detect a fault and open its switch 310, all the other eFuses 210 of the same cluster 205 are made to open their switch 310 in a synchronized fashion. This results in faster shutdown of the power supply to the associated load 140-2 without the delay associated with each eFuse 210 of the cluster 205 individually detecting a fault.

Figure 4:
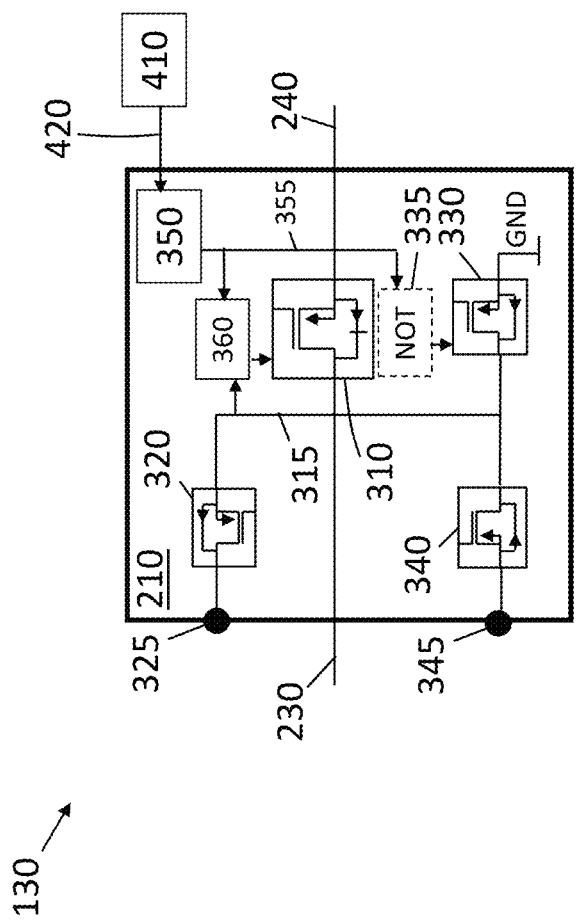
FIG. 4 is a block diagram of an eFuse used for synchronization according to one or more embodiments.

FIG. 4 is a block diagram of an eFuse 210 used for synchronization according to one or more embodiments. FIG. 4 shows an external input 420 to the switch controller 350 of each eFuse 210 from an external controller 410. The external controller 410, which is within the vehicle 100 (and SEC 130) but outside the eFuse 210, may control some aspect of operation of the vehicle 100 and include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The external controller 410 may benefit from the synchronization among eFuses 210 of a cluster 205 rather than preempting the need for the synchronization. That is, if the external input 420 were provided to every eFuse 210 of a cluster 205, only serial communication from the external controller 410 may be possible rather than communication with each eFuse 210 of the cluster 205 in parallel. Thus, providing the external input 420 to one eFuse 210 of the cluster 205 and initiating synchronization among the other eFuses 210 of the cluster 205 may be a more efficient way to control all the eFuses 210 of the cluster 205. As detailed, the external controller 410 may be involved in a forced fault or pulse width modulation (PWM) control.

A forced fault refers to any condition that requires opening the switch 310 of the eFuse 210 without the switch controller 350 detecting a fault. The specific implementation of the forced fault via the external input 420 from the external controller 410 is not limited. According to an exemplary embodiment, the external input 420 may change memory bits in registers of the switch controller 350, essentially forcing the switch controller 350 to behave as if it detected a fault. This would cause the switch controller 350 to signal the switch control logic 360 to open the switch 310 and to also signal the synchronization switch 330. According to another exemplary embodiment, the external input 420 may set a pin or flag within the switch controller 350 to signal the need to open the switch 310 and to trigger the switch controller 350 to signal the switch control logic 360 and synchronization switch 330 accordingly.

PWM control may be required for specific loads 140. For example, when the load 140-2 in FIG. 2 is a heater, the period and duty cycle of power supply to the load 140 must be controlled. Thus, rather than simply opening the switch 310, each eFuse 210 of the cluster 205 must open and close the switch 310 to achieve the correct period and duty cycle for power supply to the load 140. Based on an initiation (e.g., heater turned on) or change in setting (e.g., heater temperature changed such that period and duty cycle for power supply has changed), the external controller 410 may signal or control one of the eFuses 210 of the cluster 205. The specific implementation of PWM control via the external controller 410 is not limited.

For example, according to one exemplary embodiment, an eFuse 210 of the cluster 205 receives the external input 420 indicating the period and duty cycle required for power supply. This eFuse 210 may then use a PWM control function within the switch controller 350 to determine when the switch control logic 360 should be signaled to open or close the switch 310. Along with the switch control logic 360, the switch controller 350 would also signal the synchronization switch 330 in order to synchronize the other eFuses 210 of the cluster 205 to open or close their switches 310.

According to another exemplary embodiment, an eFuse 210 may not include PWM control functionality as part of the switch controller 350. In this case, the eFuse 210 may receive an open or close command as the external input 420. This open or close command is consistent with the period and duty cycle determined by the external controller 410 as being needed by the load 140. The switch controller 350 of the eFuse 210 that receives the command would control the switch control logic 360 and also signal the synchronization switch 330 in accordance with the external input 420.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system in a vehicle comprising:
a first fuse connected between a power source and a load, wherein the first fuse is an electronic fuse (eFuse)

configured to disconnect the load from the power source via the first fuse based on detecting a failure in the first fuse;

a second fuse connected between the power source and the load, the first fuse and the second fuse being part of a cluster of fuses, wherein the second fuse is an eFuse and the first fuse is configured to signal the second fuse to disconnect the load from the power source via the second fuse based on the first fuse detecting the failure in the first fuse without the second fuse detecting a failure in the second fuse; and a third fuse connected between the power source and a second load, wherein the third fuse is an eFuse and is not part of the cluster of fuses and is configured to continue to connect the power source to the second load despite the first fuse detecting the failure in the first fuse.

2. The system according to claim 1, wherein each of the cluster of fuses includes a switch controller and a switch configured to directly connect the power source to the load, and the switch controller of the first fuse is configured to detect the failure in the first fuse and control the switch of the first fuse to disconnect the load from the power source via the first fuse.

3. The system according to claim 2, wherein each of the cluster of fuses includes a synchronization switch, and the switch controller of the first fuse is configured to signal the synchronization switch of the first fuse based on detecting the failure in the first fuse.

4. The system according to claim 3, wherein each of the cluster of fuses includes two fault switches coupled to the synchronization switch.

5. The system according to claim 4, wherein the first fuse and the second fuse are connected via one of the two fault switches of the first fuse and one of the two fault switches of the second fuse.

6. The system according to claim 5, wherein the synchronization switch of the first fuse is configured to connect to ground based on the signal from the switch controller of the first fuse.

7. The system according to claim 6, wherein the one of the two fault switches of the first fuse and the one of the two fault switches of the second fuse are configured to connect to ground via the synchronization switch to thereby act as the signal to the second fuse to disconnect the load from the power source via the second fuse.

8. The system according to claim 3, wherein the first fuse is configured to receive an external input from an external controller that is external to the cluster of fuses.

9. The system according to claim 8, wherein the first fuse is configured to operate the switch of the first fuse and the synchronization switch of the first fuse based on the external input.

10. A method of arranging a system in a vehicle, the method comprising:

connecting a first fuse between a power source and a load, wherein the first fuse is an electronic fuse (eFuse) and is configured to disconnect the load from the power source via the first fuse based on detecting a failure in the first fuse;

connecting a second fuse connected between the power source and the load, the first fuse and the second fuse being part of a cluster of fuses, wherein the second fuse is an eFuse and the first fuse is configured to signal the second fuse to disconnect the load from the power source via the second fuse based on the first fuse detecting the failure in the first fuse without the second fuse detecting a failure in the second fuse. and connecting a third fuse between the power source and a second load, wherein the third fuse is an eFuse and is not part of the cluster of fuses and is configured to continue to connect the power source to the second load despite the first fuse detecting the failure in the first fuse.

11. The method according to claim 10, further comprising including a switch controller and a switch in each of the cluster of fuses to directly connect the power source to the load and configuring the switch controller of the first fuse to detect the failure in the first fuse and control the switch of the first fuse to disconnect the load from the power source via the first fuse.

12. The method according to claim 11, further comprising including a synchronization switch in each of the cluster of fuses, and configuring the switch controller of the first fuse to signal the synchronization switch of the first fuse based on detecting the failure in the first fuse.

13. The method according to claim 12, further comprising including two fault switches coupled to the synchronization switch in each of the cluster of fuses.

14. The method according to claim 13, further comprising connecting the first fuse and the second fuse via one of the two fault switches of the first fuse and one of the two fault switches of the second fuse.

15. The method according to claim 14, further comprising configuring the synchronization switch of the first fuse to connect to ground based on the signal from the switch controller of the first fuse.

16. The method according to claim 15, further comprising configuring the one of the two fault switches of the first fuse and the one of the two fault switches of the second fuse to connect to ground via the synchronization switch to thereby act as the signal to the second fuse to disconnect the load from the power source via the second fuse.

17. The method according to claim 12, further comprising configuring the first fuse to receive an external input from an external controller that is external to the cluster of fuses.

18. The method according to claim 17, further comprising configuring the first fuse to operate the switch of the first fuse and the synchronization switch of the first fuse based on the external input.

19. A vehicle, comprising:

a system that includes:

a first fuse connected between a power source and a load, wherein the first fuse is an electronic fuse (eFuse) configured to disconnect the load from the power source via the first fuse based on detecting a failure in the first fuse;

a second fuse connected between the power source and the load, the first fuse and the second fuse being part of a cluster of fuses, wherein the second fuse is an eFuse and the first fuse is configured to signal the second fuse to disconnect the load from the power source via the second fuse based on the first fuse detecting the failure in the first fuse without the second fuse detecting a failure in the second fuse; and a third fuse connected between the power source and a second load, wherein the third fuse is an eFuse and is not part of the cluster of fuses and is configured to continue to connect the power source to the second load despite the first fuse detecting the failure in the first fuse.

20. The vehicle of claim 19, wherein each of the cluster of fuses includes a switch controller and a switch configured to directly connect the power source to the load, and the switch controller of the first fuse is configured to detect the failure in the first fuse and control the switch of the first fuse to disconnect the load from the power source via the first fuse.

\* \* \* \* \*